US012561326B1

(12) United States Patent
Willems et al.

(10) Patent No.: US 12,561,326 B1
(45) Date of Patent: Feb. 24, 2026

(54) LATERAL JOIN

(71) Applicant: SAP SE, Walldorf (DE)

(72) Inventors: Paul Willems, Heidelberg (DE);
Florian Drescher, Munich (DE); **Till
Merker, Sandhausen (DE); Manuel
Mayr**, Walldorf (DE)

(73) Assignee: SAP SE, Walldorf (DE)

( * ) Notice: Subject to any disclaimer, the term of this
patent is extended or adjusted under 35
U.S.C. 154(b) by 0 days.

(21) Appl. No.: 19/063,021

(22) Filed: Feb. 25, 2025

(51) Int. Cl.
*G06F 16/20* (2019.01)
*G06F 16/2452* (2019.01)
*G06F 16/2453* (2019.01)
*G06F 16/2455* (2019.01)
*G06F 16/334* (2025.01)

(52) U.S. Cl.
CPC .. *G06F 16/24544* (2019.01); *G06F 16/24524*
(2019.01); *G06F 16/2456* (2019.01); *G06F
16/3341* (2019.01)

(58) Field of Classification Search
CPC ......... G06F 16/24524; G06F 16/24544; G06F
16/2456; G06F 16/3341
See application file for complete search history.

(56) References Cited

U.S. PATENT DOCUMENTS

| | | | | |
|---|---|---|---|---|
| 11,281,668 | B1* | 3/2022 | Borden | G06F 16/2445 |
| 2006/0136368 | A1* | 6/2006 | Young-Lai | G06F 16/24542 |
| 2009/0327254 | A1* | 12/2009 | Bruno | G06F 16/22 |
| 2025/0307244 | A1* | 10/2025 | Jenuwine | G06F 16/24542 |

OTHER PUBLICATIONS

Neumann, T. et al. "Unnesting arbitrary queries." Datenbanksysteme
für Business, Technologie und Web (BTW 2015). Gesellschaft für
Informatik eV, 2015: 383-402.

* cited by examiner

*Primary Examiner* — Diedra McQuitery
(74) *Attorney, Agent, or Firm* — Mintz Levin Cohn Ferris
Glovsky and Popeo, P.C.

(57) ABSTRACT

A query is received from a software application, with the
query including at least a first subquery. In response to
receiving the query, a database management system
(DBMS) generates a query execution plan for the received
query. Next, the DBMS optimizes the query execution plan
based on the first subquery to generate an optimized query
execution plan, wherein the optimized query execution plan
includes at least a first pipeline, a second pipeline, a shared
subplan, and a distinct operator, wherein the distinct opera-
tor is configured to eliminate duplicate tuples. Then, the
DBMS executes the optimized query execution plan to
identify and retrieve first data stored in a database. Next, the
DBMS provides the first data to the software application.

20 Claims, 7 Drawing Sheets

```
SELECT * FROM T, LATERAL (F(T.N));
```

| T.N | F.A | F.B |
|-----|-----|-----|
| 9   | 1   | 1   |
| 9   | 2   | 4   |
| 9   | 3   | 9   |
| 10  | 1   | 1   |
| 10  | 2   | 8   |
| 10  | 3   | 27  |

```
-- Example function demonstrating that
-- the target table can vary between rows.

CREATE FUNCTION F(INPUT_PARAM INT)
    RETURNS TABLE (A INT, B INT) AS
BEGIN
    IF :INPUT_PARAM < 10 THEN
        RETURN SELECT * FROM T1;
    ELSE
        RETURN SELECT * FROM T2;
    END IF;
END;
```

| T1.A | T1.B |
|------|------|
| 1    | 1    |
| 2    | 4    |
| 3    | 9    |

| T2.A | T2.B |
|------|------|
| 1    | 1    |
| 2    | 8    |
| 3    | 27   |

| T.N |
|-----|
| 9   |
| 10  |

*... FROM T LATERAL JOIN F(T.x, T.y) ON pred(T.z, F.z)*

Figure 4:
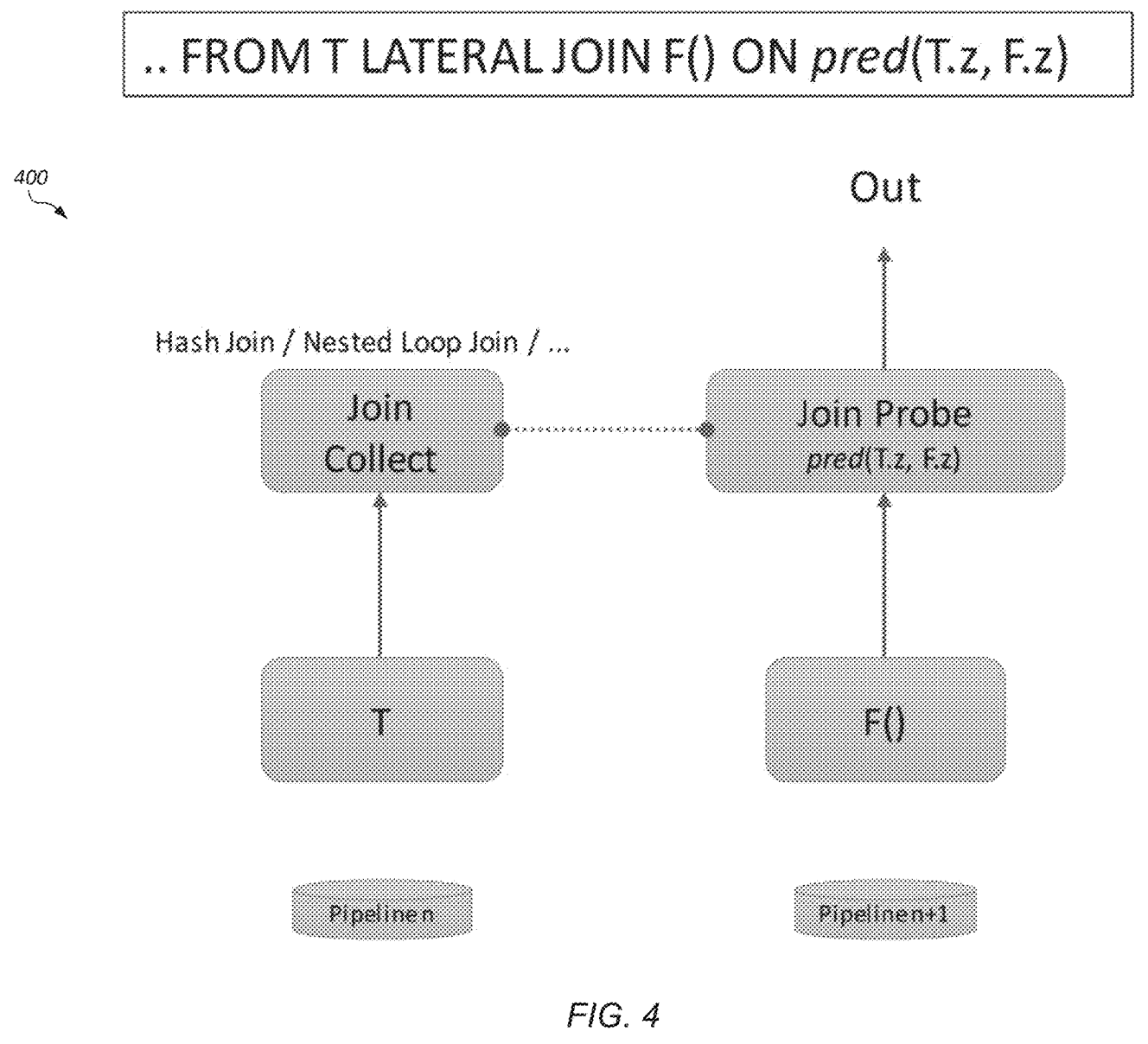

... FROM T LATERAL JOIN F() ON *pred*(T.z, F.z)

Out

Join Probe
*pred*(T.z, F.z)

F()

Pipeline n+1

Hash Join / Nested Loop Join / ...

Join
Collect

T

Pipeline n

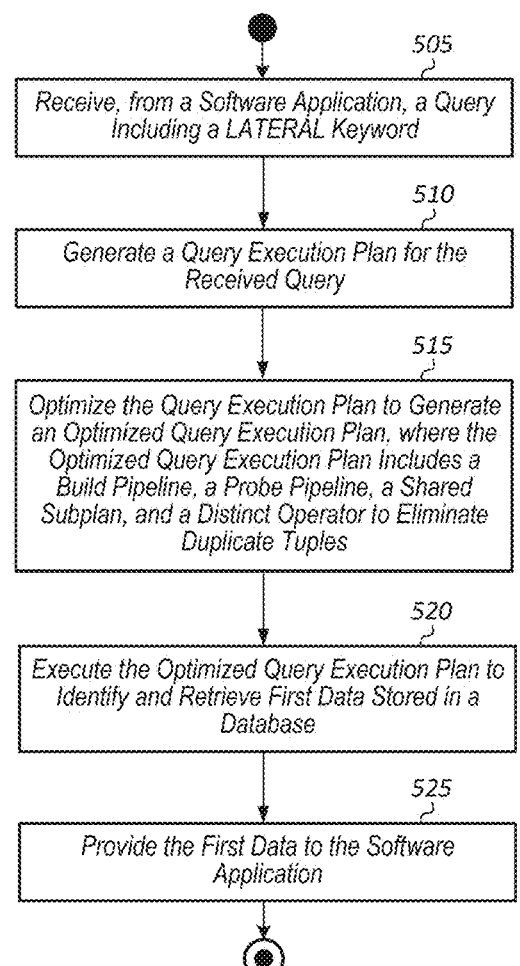

*500*

505

Receive, from a Software Application, a Query Including a LATERAL Keyword

510

Generate a Query Execution Plan for the Received Query

515

Optimize the Query Execution Plan to Generate an Optimized Query Execution Plan, where the Optimized Query Execution Plan Includes a Build Pipeline, a Probe Pipeline, a Shared Subplan, and a Distinct Operator to Eliminate Duplicate Tuples

520

Execute the Optimized Query Execution Plan to Identify and Retrieve First Data Stored in a Database

525

Provide the First Data to the Software Application

*FIG. 5*

LATERAL JOIN

TECHNICAL FIELD

The present disclosure generally relates to handling correlated subqueries.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. A database query is a mechanism for retrieving data from one or more database tables. Queries may be generated in accordance with a corresponding query language. For example, structured query language (SQL) is a declarative querying language that is used to retrieve data from a relational database. Given the complexity of queries and/or the volume of queries, the underlying databases face challenges when attempting to optimize performance.

SUMMARY

In some implementations, a query is received from a software application, with the query including at least a first subquery. In response to receiving the query, a database management system (DBMS) generates a query execution plan for the received query. Next, the DBMS optimizes the query execution plan based on the first subquery to generate an optimized query execution plan, where the optimized query execution plan includes at least a first pipeline, a second pipeline, a shared subplan, and a distinct operator, where the distinct operator eliminates duplicate tuples. Then, the DBMS executes the optimized query execution plan to identify and retrieve first data stored in a database. Next, the DBMS provides the first data to the software application.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates a diagram of execution pipelines for executing a query execution plan for a lateral join, in accordance with some example implementations of the current subject matter;

FIG. 5 illustrates a process for executing a query, in accordance with some example implementations of the current subject matter;

DETAILED DESCRIPTION

Lateral is a feature provided by a database management system (DMBS) to allow for correlated subqueries in the FROM clause of a SELECT query. The general form is: SELECT . . . . FROM S, LATERAL L.

In the above general form, S and L stand for general subqueries. Due to the LATERAL, L is allowed to refer to fields from the result of S. The semantics indicate that L is evaluated for every row in the result of S.

A simple example is the following: SELECT*FROM T1, LATERAL (SELECT*FROM T2 WHERE T1.id=T2.id1);

In the above example, the definition of LATERAL is equivalent to a normal join: SELECT*FROM T1 INNER JOIN T2 ON T1.id=T2.id1; Supported join types are INNER, LEFT OUTER, and CROSS PRODUCT.

A typical query optimizer will just remove the LATERAL keyword. The general method during query optimization to de-correlate correlated subqueries is referred to as "unnesting". In an example, a LATERAL query is used to apply a user-defined function on selected rows. In other examples, LATERAL queries may be used in other scenarios.

Figure 1:
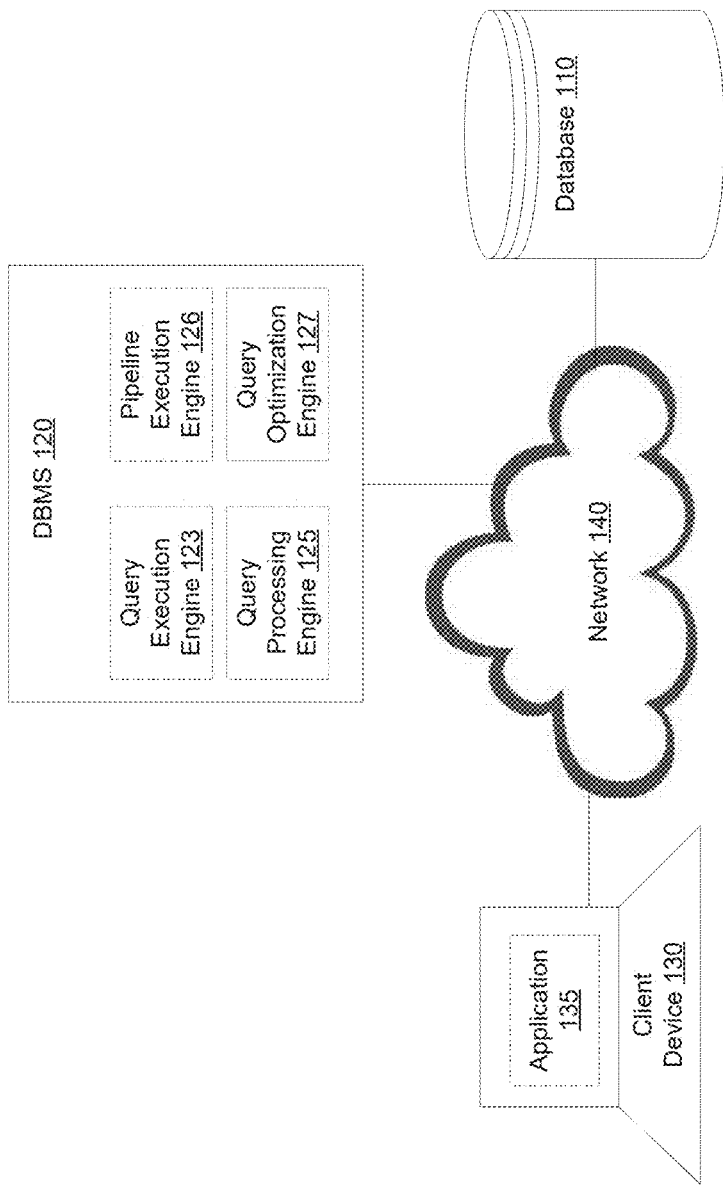
FIG. 1 illustrates a diagram of an example of a computing system, in accordance with some example implementations of the current subject matter.

FIG. 1 depicts an example of a computing system 100, in accordance with some example embodiments. Referring to FIG. 1, the computing system 100 may include a database 110, a database management system (DBMS) 120, and a client device 130. Client device 130 may execute any number of software applications including software application 135. In an example, database management system 120 includes at least query execution engine 123, query processing engine 125, pipeline execution engine 126, and query optimization engine 127. In other examples, database management system 120 may include other types of components. It is noted that database management system 120 may also be referred to as a database execution engine. It is also noted that while only a single database 110, a single database management system 120, and a single client device 130 are shown in FIG. 1, this is merely to avoid cluttering the figure. It should be appreciated that database 110 is representative of any number of databases, database management system 120 is representative of any number of database management systems, and client device 130 is representative of any number of client devices that may be included as part of computing system 100.

From an application or client perspective, it can be extremely cumbersome to access databases such as database 110. For example, an application may need to query different types of databases using complex queries. As a consequence, the application layer would need to be configured to handle the various types of databases and the various query types. Additionally or alternatively, each database 110 may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database 110 and may thus reduce the performance and response times for queries on that database layer.

In some example implementations, query execution engine 123, query processing engine 125, pipeline execution engine 126, and/or query optimization engine 127 may decouple the higher-level, application layer from the database layer (e.g., the persistence or storage layer where data including database tables may be stored and/or queried using instructions, such as commands and/or the like). The query execution engine 123, query processing engine 125, pipeline execution engine 126, and/or query optimization engine 127 may be implemented separately from the database layer and/or the application layer. Further, the query execution engine 123, query processing engine 125, pipeline execution engine 126, and/or query optimization engine 127 may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

After query execution engine 123 and/or query processing engine 125 generate a query execution plan, query optimization engine 126 may be configured to optimize the query execution plan to prevent rows from being evaluated more than once. In an example, the optimized query execution plan may include a plurality of pipelines which are executed by pipeline execution engine 126. In some embodiments, query optimization engine 126 may traverse an operator topology of the query execution plan to identify opportunities for optimizing the query execution plan. As used herein, the term "operator" may be defined as an object of a class, where the object has a run method which implements the run-time semantics of the operator. The body of the run method is a sequence of execution steps.

The database 110, the database management system 120, and the client device 130 may be communicatively coupled via a network 140. In some example embodiments, the database 110 may be a relational database. However, it should be appreciated that the database 110 may be any type of database including, for example, an in-memory database, a hierarchical database, an object database, an object-relational database, and/or the like. For example, instead of and/or in addition to being a relational database, the database 110 may be a graph database, a column store, a key-value store, a document store, and/or the like.

The database management system 120 may be configured to respond to requests from one or more client devices including, for example, the client device 130. For example, as shown in FIG. 1, the client device 130 may communicate with the database management system 120 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a desktop computer, a laptop, a smartphone, a tablet computer, a wearable apparatus, a virtual assistant, an Internet-of-Things (IoT) appliance, and/or the like.

Figure 2:
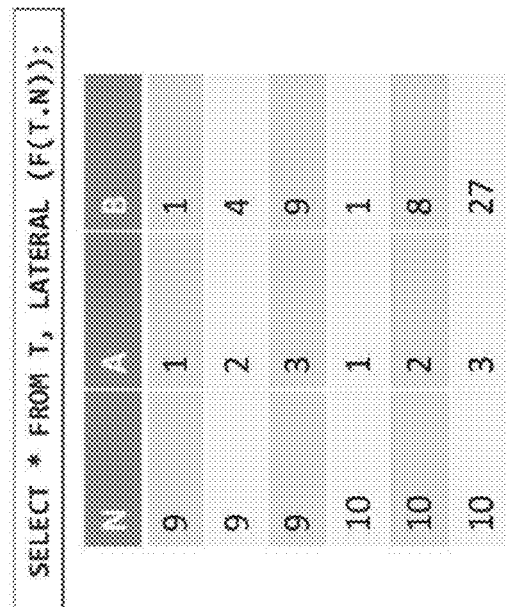
FIG. 2 illustrates a function associated with a target table, in accordance with some example implementations of the current subject matter.

Turning now to FIG. 2, an example of a function associated with a target table is depicted, in accordance with one or more embodiments of the current subject matter. The function shown in the top left of FIG. 2 demonstrates that a target table may vary between rows. On the right-side of FIG. 2 is the query result from the following query: SELECT*FROM T, LATERAL (F(T.N));

A LATERAL can be seen as an SQL-construct to simulate a "for each row in T" with more general semantics than can be modeled by a join. A LATERAL may also be referred to as a "Cross-Apply".

Another example query is the following: SELECT . . . FROM T LATERAL JOIN F(T.x$_1$, . . . , T.x$_n$) AS R ON pred.

In this example query, T could be a table or a generic subquery. The inputs of F are a subset of attributes of T. Additionally, pred is a generic Boolean predicate on attributes of T and of the result of F. In the simplest case, pred could be just TRUE, which is equivalent to a CROSS JOIN. A common example would be plain equality, such as pred(A, B)="A=B". It is noted that this example query encompasses simpler cases where F is not a table function but a plain subquery that the query optimization engine cannot unnest. It is also assumed that F is deterministic (i.e., the output only depends on the input).

In an example, it may be desired to model the LATERAL statement in a relational engine. The modeling of the LATERAL statement may be performed pragmatically so as to reuse existing components as much as possible. Also, the modeling of the LATERAL statement may be performed such that T can have duplicates, and such that F is not evaluated more than once for a given input.

Figure 3:
FIG. 3 illustrates a diagram of execution pipelines for executing a query execution plan for a lateral join, in accordance with some example implementations of the current subject matter.

Referring now to FIG. 3, a diagram of execution pipelines for executing a query execution plan for a lateral join is shown, in accordance with one or more embodiments of the current subject matter. As used herein, the term "query execution plan" may be defined as a sequence of operations for accessing a database. A "query execution plan" may be structured as a tree with relational algebra operators as nodes. Pipeline representation 300 is representative of the transformation of an optimized query plan fragment into a runtime executable format. In other words, the physical algebra of an optimized query plan fragment may be transformed into pipeline representation 300 in preparation for runtime execution of a corresponding query execution plan. As used herein, the term "pipeline" may be defined as a separate execution path within the query execution plan, where each separate execution path includes one or more operators to be executed in sequence. As shown in FIG. 3, the pipeline representation 300 represents the following lateral join statement: FROM T LATERAL JOIN F(T.x, T.y) ON pred (T.z, F.z).

In an example, existing grouping algorithms may be used to avoid evaluating F redundantly. A more efficient grouping algorithm may be used in special cases, avoiding full hashing and grouping. If the incoming rows are sorted or clustered on (x,y), then the value is compared to the successor. If (x,y) are unique (e.g., key of T), then the values are collected.

As shown in FIG. 3, the start of pipeline n is the table scan block 310, with table scan block 310 pushing input rows out to shared subplan 315. The tuples that are pushed from shared subplan 315 are sent to both the build side and the probe side. For example, as shown in FIG. 3, from shared subplan 315, the rows go to the join collect 320A and to the distinct operator 325A, with distinct operator 325A removing duplicates from the rows. It is noted that shared subplan 315 does not need to be a pipeline breaker. In an embodiment, the query execution engine may support immediately forwarding the incoming tuples to both the join collect 320A and the distinct operator 325A. In other words, shared subplan 315 may employ pipelining on both of its outputs.

On the right-side of pipeline representation 300, which goes to the lateral, the distinct operator 325B removes all duplicates from the rows. The lateral join evaluates F for every tuple on the left side of the join. That means that the output will have duplicate rows if the left side has duplicate rows. In an embodiment, when F is assumed to be deterministic, there is no need to evaluate F twice on the same inputs, but rather, the previous result may be reused. The outputs of distinct operator 325B are the set of non-equal tuples (x,y). This set of non-equal tuples (x,y) are fed as inputs into the probe pipeline block 330 on the right-side. For each set of non-equal tuples (x,y), the function F(x,y) is evaluated. The outputs from block 330 are joined with the left-side in join probe 320B, with join probe 320B representing the lateral join.

The advantage of the distinct operators 325A-B is an increase in efficiency by avoiding redundant evaluation of the function F on the same row. To accomplish this, the pipeline execution engine (e.g., pipeline execution engine 126 of FIG. 1) needs to determine which outputs from the apply block 330 map to which inputs. Accordingly, in order for this determination to be performed, the apply block 330 outputs the original inputs x and y along with z. The join predicate in join block 320B is also extended with an extra check of (x,y) mapping to the left-side. It is noted that the dotted lines shown in FIG. 3 between the operators 320A-B and the dotted lines shown in FIG. 3 between the operators 325A-B indicate the sharing of runtime state between the separate pipelines.

Turning now to FIG. 4, a diagram of execution pipelines for executing a query execution plan for a lateral join is shown, in accordance with one or more embodiments of the current subject matter. Pipeline representation 400 is representative of the transformation of an optimized query plan fragment into a runtime executable format. As shown in FIG. 4, the pipeline representation 400 represents the following lateral join statement: FROM T LATERAL JOIN F( ) ON pred (T.z, F.z). This lateral join statement is equivalent to a plain join, such as . . . FROM T JOIN F( ) ON T.z=F.z.

The example shown in FIG. 4 is a case where there are no correlated parameters. In this example, F has no inputs. The results of F are repeated per row of T. But F( ) is only evaluated once since F( ) does not depend on the left-side rows. From a software design perspective, it may be preferable to handle this case in executable plan generation instead of requiring the rewrite during query optimization. In an example, when the special case shown in FIG. 4 is detected, a distinct operator is not applied to the left-side of pipeline representation 400.

Referring now to FIG. 5, a process for optimizing a query execution plan for a query with a LATERAL keyword is depicted, in accordance with one or more embodiments of the current subject matter. A query from a software application is received by a database management system (e.g., database management system 120 of FIG. 1), where the query includes a LATERAL keyword (block 505). In response to receiving the query, the database management system generates a query execution plan for the received query (block 510). Next, the database management system optimizes the query execution plan based on the query including the LATERAL keyword in order to generate an optimized query execution plan, where the optimized query execution plan includes at least a build pipeline, a probe pipeline, a shared subplan, and a distinct operator to eliminate duplicate tuples (block 515). It is noted that the build pipeline may be referred to more generally as a first pipeline, and the probe pipeline may be referred to more generally as a second pipeline. After block 515, the database management system executes the optimized query execution plan to identify and retrieve first data stored in a database (block 520). Next, the database management system provides the first data to the software application (block 525). After block 525, method 500 may end.

Figure 6A:
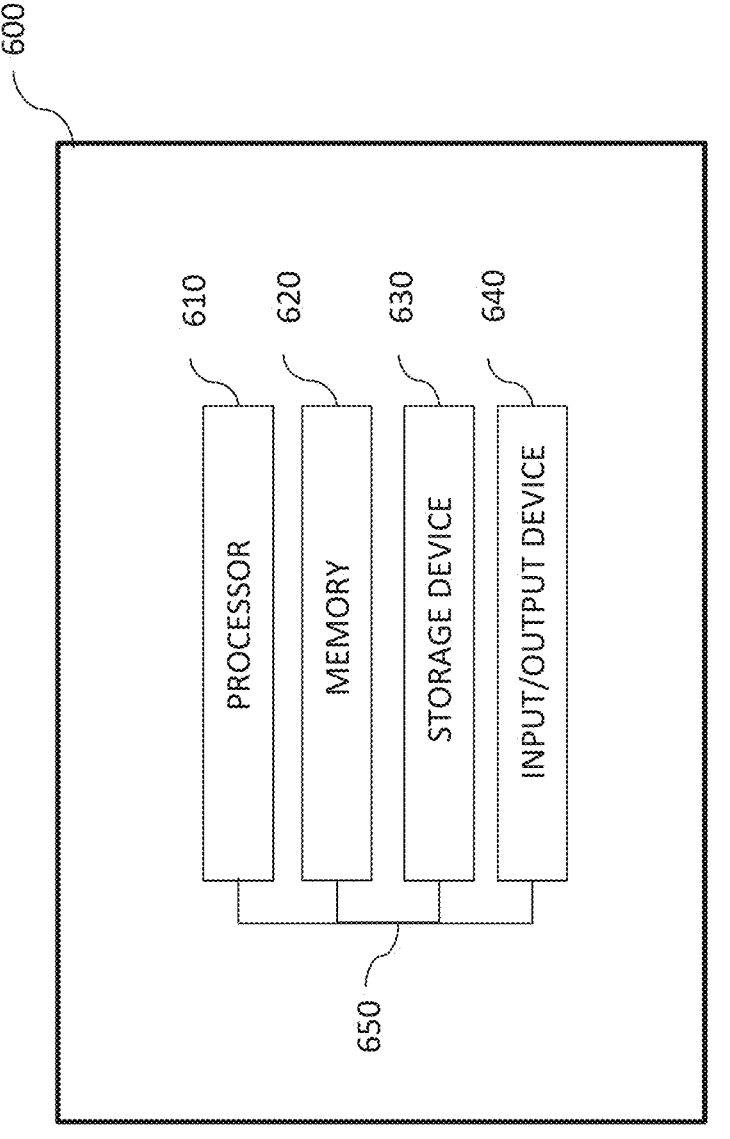
FIG. 6A depicts an example of a system, in accordance with some example implementations of the current subject matter.

In some implementations, the current subject matter may be configured to be implemented in a system 600, as shown in FIG. 6A. The system 600 may include a processor 610, a memory 620, a storage device 630, and an input/output device 640. Each of the components 610, 620, 630 and 640 may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The memory 620 may store information within the system 600. In some implementations, the memory 620 may be a computer-readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer-readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

Figure 6B:
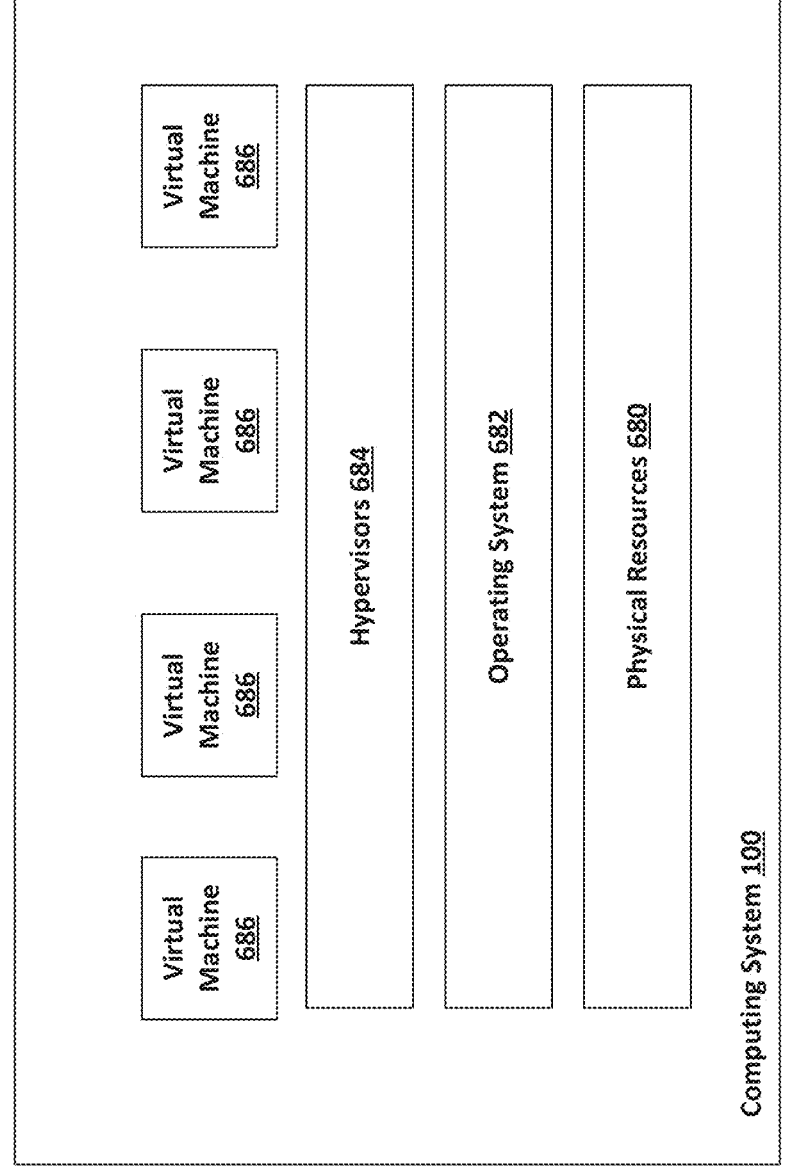
FIG. 6B depicts another example of a system, in accordance with some example implementations of the current subject matter.

FIG. 6B depicts an example implementation of the computing system 100 (of FIG. 1). The computing system 100 may be implemented using various physical resources 680, such as at least one or more hardware servers, at least one storage, at least one memory, at least one network interface, and the like. The computing system 100 may also be implemented using infrastructure, as noted above, which may include at least one operating system 682 for the physical resources 680 and at least one hypervisor 684 (which may create and run at least one virtual machine 686). For example, each multitenant application may be run on a corresponding virtual machine 686.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising: at least one processor; and at least one memory storing instructions that, when executed by the at least one processor, cause operations comprising: receiving, from a software application, a query including at least a first subquery; generating a query execution plan for the received query; optimizing the query execution plan based on the first subquery to generate an optimized query execution plan, wherein the optimized query execution plan comprises at least a first pipeline and a second pipeline, at least one shared subplan, and at least one distinct operator, wherein the at least one distinct operator is configured to eliminate duplicate tuples; executing the optimized query execution plan to identify and retrieve first data stored in a database; and providing the first data to the software application.

Example 2: The system of Example 1, wherein optimizing the query execution plan comprises generating a pipeline execution representation.

Example 3: The system of any of Examples 1-2, wherein the query is a nested query, and wherein the first subquery is correlated with at least a second subquery.

Example 4: The system of any of Examples 1-3, wherein the first subquery comprises a JOIN condition.

Example 5: The system of any of Examples 1-4, wherein the first subquery is preceded by a LATERAL keyword.

Example 6: The system of any of Examples 1-5, wherein the LATERAL keyword specifies a LATERAL JOIN condition.

Example 7: The system of any of Examples 1-6, wherein the LATERAL keyword specifies a table user-defined function.

Example 8: The system of any of Examples 1-7, wherein the at least one shared subplan connects the first pipeline to the second pipeline.

Example 9: The system of any of Examples 1-8, wherein the at least one shared subplan connects the first pipeline to the second pipeline at the at least one distinct operator.

Example 10: The system of any of Examples 1-9, wherein rows from the at least one shared subplan are provided to the at least one distinct operator.

Example 11: A computer-implemented method comprising: receiving, from a software application, a query including at least a first subquery; generating a query execution plan for the received query; optimizing the query execution plan based on the first subquery to generate an optimized query execution plan, wherein the optimized query execution plan comprises at least a first pipeline and a second pipeline, at least one shared subplan, and at least one distinct operator, wherein the at least one distinct operator is configured to eliminate duplicate tuples; executing the optimized query execution plan to identify and retrieve first data stored in a database; and providing the first data to the software application.

Example 12: The computer-implemented method of Example 11, wherein optimizing the query execution plan comprises generating a pipeline execution representation.

Example 13: The computer-implemented method of any of Examples 11-12, wherein the query is a nested query, and wherein the first subquery is correlated with at least a second subquery.

Example 14: The computer-implemented method of any of Examples 11-13, wherein the first subquery comprises a JOIN condition.

Example 15: The computer-implemented method of any of Examples 11-14, wherein the first subquery is preceded by a LATERAL keyword.

Example 16: The computer-implemented method of any of Examples 11-15, wherein the LATERAL keyword specifies a LATERAL JOIN condition.

Example 17: The computer-implemented method of any of Examples 11-16, wherein the LATERAL keyword specifies a table user-defined function.

Example 18: The computer-implemented method of any of Examples 11-17, wherein the at least one shared subplan connects the first pipeline to the second pipeline.

Example 19: The computer-implemented method of any of Examples 11-18, wherein the at least one shared subplan connects the first pipeline to the second pipeline at the at least one distinct operator.

Example 20: A non-transitory computer readable storage medium storing instructions, which when executed by at least one data processor, result in operations comprising: receiving, from a software application, a query including at least a first subquery; generating a query execution plan for the received query; optimizing the query execution plan based on the first subquery to generate an optimized query execution plan, wherein the optimized query execution plan comprises at least a first pipeline and a second pipeline, at least one shared subplan, and at least one distinct operator, wherein the at least one distinct operator is configured to eliminate duplicate tuples; executing the optimized query execution plan to identify and retrieve first data stored in a database; and providing the first data to the software application.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A system comprising:
   at least one processor; and
   at least one memory storing instructions that, when executed by the at least one processor, cause operations comprising:
      receiving, from a software application, a query including at least a first subquery;
      generating a query execution plan for the received query;
      optimizing the query execution plan based on the first subquery to generate an optimized query execution plan, wherein the optimized query execution plan comprises at least a first pipeline and a second pipeline, at least one shared subplan, and at least one distinct operator, wherein the at least one distinct operator is configured to eliminate duplicate tuples;
      executing the optimized query execution plan to identify and retrieve first data stored in a database; and
      providing the first data to the software application.

2. The system of claim 1, wherein optimizing the query execution plan comprises generating a pipeline execution representation.

3. The system of claim 1, wherein the query is a nested query, and wherein the first subquery is correlated with at least a second subquery.

4. The system of claim 1, wherein the first subquery comprises a JOIN condition.

5. The system of claim 1, wherein the first subquery is preceded by a LATERAL keyword.

6. The system of claim 5, wherein the LATERAL keyword specifies a LATERAL JOIN condition.

7. The system of claim 5, wherein the LATERAL keyword specifies a table user-defined function.

8. The system of claim 1, wherein the at least one shared subplan connects the first pipeline to the second pipeline.

9. The system of claim 8, wherein the at least one shared subplan connects the first pipeline to the second pipeline at the at least one distinct operator.

10. The system of claim 1, wherein rows from the at least one shared subplan are provided to the at least one distinct operator.

11. A computer-implemented method comprising:

receiving, from a software application, a query including at least a first subquery;

generating a query execution plan for the received query;

optimizing the query execution plan based on the first subquery to generate an optimized query execution plan, wherein the optimized query execution plan comprises at least a first pipeline and a second pipeline, at least one shared subplan, and at least one distinct operator, wherein the at least one distinct operator is configured to eliminate duplicate tuples;

executing the optimized query execution plan to identify and retrieve first data stored in a database; and providing the first data to the software application.

12. The computer-implemented method of claim 11, wherein optimizing the query execution plan comprises generating a pipeline execution representation.

13. The computer-implemented method of claim 11, wherein the query is a nested query, and wherein the first subquery is correlated with at least a second subquery.

14. The computer-implemented method of claim 11, wherein the first subquery comprises a JOIN condition.

15. The computer-implemented method of claim 11, wherein the first subquery is preceded by a LATERAL keyword.

16. The computer-implemented method of claim 15, wherein the LATERAL keyword specifies a LATERAL JOIN condition.

17. The computer-implemented method of claim 15, wherein the LATERAL keyword specifies a table user-defined function.

18. The computer-implemented method of claim 11, wherein the at least one shared subplan connects the first pipeline to the second pipeline.

19. The computer-implemented method of claim 18, wherein the at least one shared subplan connects the first pipeline to the second pipeline at the at least one distinct operator.

20. A non-transitory computer readable storage medium storing instructions, which when executed by at least one data processor, result in operations comprising:

receiving, from a software application, a query including at least a first subquery;

generating a query execution plan for the received query;

optimizing the query execution plan based on the first subquery to generate an optimized query execution plan, wherein the optimized query execution plan comprises at least a first pipeline and a second pipeline, at least one shared subplan, and at least one distinct operator, wherein the at least one distinct operator is configured to eliminate duplicate tuples;

executing the optimized query execution plan to identify and retrieve first data stored in a database; and providing the first data to the software application.

* * * * *